United States Patent [19]

Terrill et al.

[11] Patent Number: 4,824,928

[45] Date of Patent: Apr. 25, 1989

[54] COPOLYESTER WHICH IS PARTICULARLY SUITABLE FOR USE IN MAKING TIRE CORD

[75] Inventors: Edward R. Terrill; Douglas D. Callander, both of Akron, Ohio

[73] Assignee: The Goodyear Tire & Rubber Company, Akron, Ohio

[21] Appl. No.: 173,903

[22] Filed: Mar. 28, 1988

[51] Int. Cl.$^4$ ............................................. C08G 63/18
[52] U.S. Cl. ..................................... 528/190; 528/193
[58] Field of Search ................................. 528/193, 190

[56] References Cited

U.S. PATENT DOCUMENTS 4,731,433 3/1988 Yatsu et al. ......................... 528/193

Primary Examiner—Maurice J. Welsh
Assistant Examiner—L. Henderson
Attorney, Agent, or Firm—Alvin T. Rockhill

[57] ABSTRACT

This invention discloses a copolyester which has been found to be optically anisotropic in the melt and which readily undergoes melt processing to form quality fibers and molded articles. These copolyesters are particularly suitable for use in making tire cord which has an outstanding combination of properties including tenacity, modulus, toughness and flex life. This invention specifically reveals a copolyester which is comprised of repeat units which are derived from (A) at least one member selected from the group consisting of phenyl hydroquinone, hydroxy benzoic acid and hydroxy naphthoic acid; (B) at least one diol selected from the group consisting of 1,4-bis(4-hydroxycumyl) benzene, 1,3-bis(4-hydroxycumyl) benzene, alkyl substituted 1,4-bis(4-hydroxycumyl) benzene, and alkyl substituted 1,3-bis(4-hydroxycumyl) benzene; and (C) a diacid component which is comprised of terephthalic acid and optionally up to about 10 mole percent isophthalic acid.

11 Claims, No Drawings

COPOLYESTER WHICH IS PARTICULARLY SUITABLE FOR USE IN MAKING TIRE CORD

BACKGROUND OF THE INVENTION

A wide variety of homopolyesters and copolyesters are currently being used in making fibers and molded articles. In selecting a polyester for a given application, its physical and chemical properties are taken into account. For instance, polyethylene terephthalate (PET) has an excellent combination of properties for utilization in making reinforcements for rubber articles, such as tire cord. Even though PET has an excellent overall combination of properties for utilization in making tire cord, it would be desirable for it to have higher tenacity and modulus in order to attain better durability and stiffness. On the other hand, even though fibers made utilizing known anisotropic melt polyesters have high tenacity and modulus, it would be desirable for them to have higher elongation and toughness in order to attain better flex life in tires.

SUMMARY OF THE INVENTION

This invention discloses a copolyester which has a very outstanding combination of properties for utilization in making fibers for tire cord and reinforcements for other rubber articles. Fibers made utilizing the copolyesters of this invention have higher tenacity and modulus than fibers which are made utilizing PET. Additionally, the copolyester fibers of this invention exhibit higher elongation and toughness than fibers made utilizing other known anisotropic melt polyesters. Thus, the copolyesters of this invention have a very outstanding combination of properties for utilization in manufacturing reinforcements for rubber articles, such as tire cord.

This invention specifically discloses a copolyester which is comprised of repeat units which are derived from (a) a diol component which is comprised of from about 80 to about 99 mole percent phenyl hydroquinone and from about 1 to about 20 mole percent of at least one member selected from the group consisting of 1,4-bis(4-hydroxycumyl) benzene, 1,3-bis(4-hydroxycumyl) benzene, alkyl substituted 1,4-bis(4-hydroxycumyl) benzene, and alkyl substituted 1,3-bis(4-hydroxycumyl) benzenes; and (b) a diacid component which is comprised of from about 90 to about 100 mole percent terephthalic acid and from 0 to about 10 mole percent isophthalic acid.

The subject invention also reveals a copolyester which is comprised of repeat units which are derived from (a) at least one aromatic hydroxy acid selected from the group consisting of hydroxy benzoic acid and hydroxy naphthoic acid; (b) at least one diol selected from the group consisting of 1,4-bis(4-hydroxycumyl) benzene, 1,3-bis(4-hydroxycumyl) benzene, alkyl substituted 1,4-bis(4-hydroxycumyl) benzenes, and alkyl substituted 1,3-bis(4-hydroxycumyl) benzenes; and (c) a diacid component which is comrised of from about 90 to 100 mole percent terephthalic acid and from 0 to about 10 mole percent isophthalic acid; wherein the mole ratio of aromatic hydroxy acid to diol is within the range of about 80:20 to about 99:1.

DETAILED DESCRIPTION OF THE INVENTION

The copolyesters of this invention are prepared by reacting a diol component with a diacid component. The preferred copolyesters of this invention utilize phenyl hydroquinone in their diol component. In fact, the diol component utilized in making such copolyesters will contain from about 80 to about 99 mole percent phenyl hydroquinone. It is preferred for the diol component in such polyesters to contain from about 90 to about 98 mole percent phenyl hydroquinone and it is more preferred for them to contain from about 93 to about 97 mole percent phenyl hydroquinone.

The diol component utilized in making the preferred copolyesters of this invention will also contain from about 1 to about 20 mole percent of at least one member selected from the group consisting of 1,4-bis(4-hydroxycumyl) benzene, 1,3-bis(4-hydroxycumyl) benzene, alkyl substituted 1,4-bis(4-hydroxycumyl) benzene, and alkyl substituted 1,3-bis(4-hydroxycumyl) benzene. Such copolyesters will preferably contain from about 2 to about 10 mole percent of such diol and will more preferably contain from about 3 to about 7 mole percent of such diols. The alkyl substituted 1,4-bis(4-hydroxycumyl) benzenes which can be utilized have the structural formula:

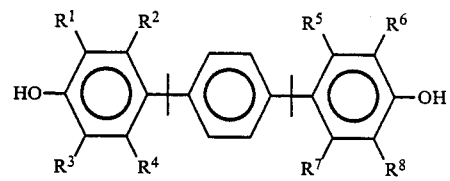

wherein $R^1$, $R^2$, $R^3$, $R^4$, $R^5$, $R^6$, $R^7$ and $R^8$ can be the same or different and represent hydrogen atoms or alkyl groups containing from 1 to 10 carbon atoms. In most cases, $R^1$, $R^2$, $R^3$, $R^4$, $R^5$, $R^6$, $R^7$, and $R^8$ will represent hydrogen atoms or alkyl groups containing from 1 to 4 carbon atoms. Some representative examples of such alkyl substituted 1,4-bis(4-hydroxycumyl) benzenes include 1,4-bis(2,3,5,6-tetramethyl-4-hydroxycumyl) benzene, 1,4-bis(3,5-dimethyl 4-hydroxycumyl) benzene and 1,4-bis(3,4-diethyl 4-hydroxycumyl) benzene. The alkyl substituted 1,3-bis(4-hydroxycumyl) benzenes that can be utilized have the structural formula:

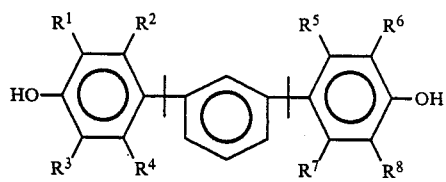

wherein $R^1$, $R^2$, $R^3$, $R^4$, $R^5$, $R^6$, $R^7$, and $R^8$ represent hydrogen atoms or alkyl groups containing from 1 to 10 carbon atoms. In most cases, $R^1$, $R^2$, $R^3$, $R^4$, $R^5$, $R^6$, $R^7$, and $R^8$ will represent hydrogen atoms or alkyl groups containing from 1 to 4 carbon atoms. Some representative examples of suitable alkyl substituted 1,3-bis(4-hydroxycumyl) benzenes include: 1,3-bis(2,3,5,6-tetramethyl 4-hydroxycumyl) benzene, 1,3-bis(3,5-dimethyl 4-hydroxycumyl) benzene and 1,3-bis(3,5-diethyl 4-hydroxycumyl) benzene.

The diacid component utilized in preparing the copolyesters of this invention will contain at least about 90 mole percent terephthalic acid. The diacid component can optionally contain up to about 10 mole percent isophthalic acid. Thus, the diacid component utilized in preparing the copolyesters of this invention is comprised of from about 90 to about 100 mole percent terephthalic acid and from 0 to about 10 mole percent isophthalic acid.

In an alternative embodiment of the subject invention, an aromatic hydroxy acid selected from the group consisting of hydroxybenzoic acid and hydroxynaphthoic acid is utilized in conjunction with or in lieu of the phenyl hydroquinone. In such copolyesters, the mole ratio of aromatic hydroxy acid to diol is within the range of about 80:20 to about 99:1. Such copolyesters are made by polymerizing (a) the aromatic dihydroxy acid: (b) at least one diol selected from the group consisting of 1,4-bis(4-hydroxycumyl) benzene, 1,3-bis(4-hydroxycumyl) benzene, alkyl substituted 1,4-bis(4-hydroxycumyl) benzenes, and alkyl substituted 1,3-bis(4-hydroxycumyl) benzenes; and (c) a diacid component which is comprised of terephthalic acid and optionally up to about 10 mole percent isophthalic acid.

The copolyesters of this invention can be synthesized utilizing conventional polymerization techniques which are well known to those skilled in the art. For instance, the copolyesters of this invention can be prepared by melt diacetate polymerization, melt diphenyl ester polymerization, in situ melt polymerization, solution polymerization or interfacial polymerization. The in situ melt diacetate polymerization process is generally the preferred technique for synthesizing the copolyesters of this invention. It is generally appropriate to prepare the copolyesters of this invention utilizing the same equipment and same general procedures as are utilized by persons skilled in the art of preparing aromatic polyesters. Thus, conventional temperatures, catalysts, amounts of catalysts, stabilizers and the like, are used in manners well known in the literature and art. For instance, a two step process can be utilized in preparing the aromatic copolyesters of this invention. In the first step, the diol component and diacid component can be heated to a temperature which is within the range of about 200° C. to about 300° C. under an inert gas atmosphere, such as nitrogen or a Noble gas. For economic reasons, nitrogen will normally be utilized. This polymerization reaction can be carried out in the presence of appropriate catalysts such as titanium alkoxides, sodium acetate, tin acetate, and the like. In the second step, a polycondensation reaction can be carried out under a reduced pressure of less than about 0.5 mm of mercury (66.7 Pascals) at a temperature which is typically within the range of about 300° C. to about 400° C. The polymerization time required will vary with the amount and type of catalyst used as well as the polymerization temperature utilized. It will also depend somewhat upon the desired molecular weight of the aromatic copolyester being synthesized.

The copolyesters of this invention are, of course, comprised of repeat units which are derived from the monomers (the diol component and the diacid component) utilzed in their preparation. For instance, a copolyester which is prepared by polymerizing phenyl hydroquinone, 4,4-bis(4-hydroxycumyl) benzene, and terephthalic acid will have the structural formula:

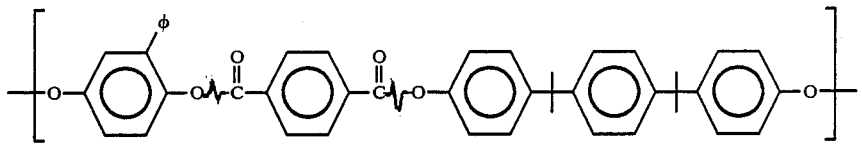

wherein $\phi$ represents a phenyl group and wherein indicates that the repeat units which are derived from phenyl hydroquinone and 1,4-bis(4-hydroxycumyl) benzene can be distributed throughout the polymer chain in random order.

The aromatic copolyesters of this invention typically have a number average molecular weight of at least about 5,000. Such aromatic copolyesters generally have a number average molecular weight which is within the range of about 5,000 to about 100,000. The aromatic copolyesters of this invention preferably have a number average molecular weight which is within the range of about 10,000 to about 60,000. In most cases, it will be preferred for the aromatic copolyesters of this invention to have a number average molecular weight which is within the range pf about 15,000 to about 40,000.

The aromatic copolyesters of this invention can be molded into a wide variety of useful articles utilizing standard molding techniques well known to persons skilled in the art. The aromatic copolyesters of this invention can, of course, also be spun into fiber utilizing known techniques. For instance, the aromatic copolyesters of this invention can be melt spun utilizing equipment and techniques which are utilized in melt spinning PET. The filaments produced can be subjected to thermal treatment in order to further enhance the physical properties of the fibers. The fibers can then be utilized in the preparation of tire cords or reinforcements for other rubber articles such as belts or hoses.

This invention is illustrated by the following examples which are merely for the purpose of illustration and are not to be regarded as limiting the scope of the invention or the manner in which it can be practiced. Unless specifically indicated otherwise, parts and percentages are given by mole percent.

EXAMPLE 1

In this experiment an aromatic copolyester was prepared utilizing an in situ melt diacetate polymerization technique. In the procedure used, a polymerization reactor was charged with 17.97 grams of phenyl hydroquinone, 1.21 grams of 1,4-bis(4-hydroxycumyl) benzene, and 30 ml of acetic anhydride. The reactants were heated to 140° C. and the reactants were allowed to reflux for 15 minutes. Acetic acid was formed by the reaction which took place and 11.4 ml of acetic acid was removed from the reaction mixture by distillation. Residual acetic anhydride was removed from the reaction mixture by vacuum distillation. After removal of the excess acetic anhydride was completed, 16.61 grams of terephthalic acid was added to the reaction mixture. The polymerization reactor was heated to about 270° C. until 11.4 ml of acetic acid had been evolved. The pressure in the polymerization reactor was then gradually reduced to 0.1 mm of mercury (13.3 Pascals) and the temperature was increased to 350° C. The reaction mixture was stirred until a high melt viscosity polymer was obtained.

The aromatic copolyester which was synthesized was dried and melt spun utilizing a fiber extrusion device for small polymer samples. The extrusion device forced the aromatic copolyester through a spinneret hole having a diameter of 0.009 inches (0.023 centimeters) at a temperature of 350° C. and under a pressure of 250 lbs. per square inch ($1.7 \times 10^6$ Pascals). The fiber extrusion device was operated at a windup speed of 265 meters per minute (mpm). The filament produced was determined to have an average denier of 20, an average tenacity of 5.8 grams per denier, an average elongation of 2.2%, and an average initial modulus of 300 grams per denier. Filament samples were heat treated on a metal rack in a flowing nitrogen stream at a maximum temperature of 330° C. for 14 hours. It took about 4 hours to heat the filament from 25° C. to 330° C. and about 1 hour to cool the filaments from 330° C. back to 25° C. for a total treatment time of 19 hours. After this heat treatment, the filaments had an average denier of 20, an average tenacity of 11 grams per denier, an average elongation of 4.4%, and an average initial modulus of 340 grams per denier. The best filament made had a tenacity of 28 grams per denier, an initial modulus of 700 grams per denier and an elongation to break of 5.5%.

EXAMPLES 2–6

In this experiment, aromatic copolyesters containing various amounts of phenyl hydroquinone, 1,4-bis(4-hydroxycumyl) benzene, terephthalic acid, and isophthalic acid were prepared utilizing the polymerization technique disclosed in Example 1. The aromatic copolyesters synthesized were then extruded into fibers utilizing the technique described in Example 1 and compared with fibers made utilizing PET and two known anisotropic melt polyesters (a homopolyester which was comprised of repeat units which were derived from phenyl hydroquinone and terephthalic acid and a copolyester which was comprised of repeat units which were derived from 1,4-hydroxybenzoic acid and 2,6-hydroxynaphthoic acid). The tenacity, elongation and modulus of the fibers prepared is reported in Table I.

TABLE I

| Ex. | Composition* | Tenacity (gpd) | Elongation (%) | Modulus (gpd) |
|---|---|---|---|---|
| 1 | 96.5 PHQ/3.5 BHCB—100T | 11 | 4.4 | 340 |
| 2 | 96.5 PHQ/3.5 BHCB—98.25T/1.75I | 9.4 | 5.2 | 250 |
| 3** | 90 PHQ/10 BHCB—95T/5I | 7.0 | 6.0 | 220 |
| 4 | PET | 8.4 | 20 | 95 |
| 5 | 100 PHQ—100T | 13 | 3.3 | 380 |
| 6 | 40 HBA/60 HNA | 11 | 3.0 | 350 |

*PHQ = phenyl hydroquinone
BHCB = 1,4-bis(4-hydroxycumyl) benzene
T = terephthalic acid
I = isophthalic acid
HBA = 1,4-hydroxybenzoic acid
HNA = 2,6-hydroxynaphthoic acid
**A filament made in Example 3 was determined to have an elongation to break of 8%.

The diacid component utilized in preparing the aromatic copolyester of Example 1 contained 96.5 mole percent phenyl hydroquinone and 3.5 mole percent 1,4-bis(4-hydroxycumyl) benzene. The diacid component utilized in preparing Example 1 contained 100 mole percent terephthalic acid. The diol component utilized in preparing the aromatic copolyester of Example 2 contained 96.5 mole percent phenyl hydroquinone and 3.5 mole percent 1,4-bis(4-hydroxycumyl) benzene. The diacid component utilized in the preparation of the aromatic copolyester of Example 2 contained 98.25 mole percent terephthalic acid and 1.75 mole percent isophthalic acid. The aromatic copolyester prepared in Example 3 was prepared utilizing a diol component which contained 90 mole percent phenyl hydroquinone and 10 mole percent 1,4-bis(4-hydroxycumyl) benzene. The diacid component utilized in the preparation of the copolyester of Example 3 contained 95 mole percent terephthalic acid and 5 mole percent isophthalic acid. The diacid component utilized in the preparation of the polyester of Example 5 contained 100 mole percent phenyl hydroquinone and the diacid component utilized in the preparation of the polyester of Example 5 contained 100 mole percent terephthalic acid. The hydroxyacid components utilized in Example 6 were comprised of 40 mole percent 1,4-hydroxybenzoic acid and 60 mole percent 2,6-hydroxynaphthoic acid.

As can be seen by comparing Examples 1, 2, and 3 with Example 4, fibers which are made utilizing the aromatic copolyesters of this invention have a much higher modulus than do fibers which are made utilizing PET. In fact, the fibers made utilizing the aromatic copolyesters of this invention had a modulus which was twice as great as the modulus of fibers which were made utilizing PET. As can be seen by comparing Examples 1, 2, and 3 with Examples 5 and 6, fibers which were made utilizing the aromatic copolyesters of this invention had a greater elongation and toughness than did fibers which were made utilizing known anisotropic melt polyesters. This means that tire cords which are made utilizing the aromatic copolyesters of this invention will have a better flex life than will tire cords which are made utilizing known anisotropic melt polyesters. These comparative experiments show that tire cords made utilizing the aromatic copolyesters of this invention will have a greater modulus than will tire cords which are made utilizing PET. Such tire cords which are made utilizing the aromatic copolyesters of this invention will also have a better flex life than will tire cords which are made utilizing known anisotropic melt polyesters. For these reasons, tire cord can be made utilizing the copolyesters of this invention which have a better overall combination of properties than do tire cords which are made utilizing PET or known anisotropic melt polyesters.

Examples 5 and 6 were included to show that it is necessary to incorporate a small amount of 1,4-bis(4-hydroxycumyl) benzene into the aromatic copolyester in order to achieve acceptable elongation. In fact, the elongation observed in Examples 5 and 6 was less than that attained utilizing the copolyesters of this invention (see Examples 1, 2 and 3 wherein an elgonation within the range of 4.4% to 6% was attained). Thus, it is necessary to include 1,4-bis(4-hydroxycumyl) benzene in the diol component in order to prepare aromatic copolyesters which can be manufactured into tire cords which have improved flex life over that attained when utilizing known anisotropic melt polyesters.

While certain representative embodiments have been shown for the purpose of illustrating the present invention, it will be apparent to those skilled in this art that various changes and modifications can be made therein without departing from the scope of the present invention.

What is claimed is:

1. A copolyester which is comprised of repeat units which are derived from (a) a diol component which is comprised of from about 80 to about 99 mole percent phenyl hydroquinone and from about 1 to about 20 mole percent of at least one member selected from the group consisting of 1,4-bis(4-hydroxycumyl) benzene, 1,3-bis(4-hydroxycumyl) benzene, alkyl substituted 1,4-bis(4-hydroxycumyl) benzene, and alkyl substituted 1,3-bis(4-hydroxycumyl) benzenes; and (b) a diacid component which is comprised of from about 90 to about 100 mole percent terephthalic acid and from 0 to about 10 mole percent isophthalic acid.

2. A copolyester which is comprised of repeat units which are derived from (a) at least one aromatic hydroxy acid selected from the group consisting of hydroxy benzoic acid and hydroxy naphthoic acid; (b) at least one diol selected from the group consisting of 1,4-bis(4-hydroxycumyl) benzene, 1,3-bis(4-hydroxycumyl) benzene, alkyl substituted 1,4-bis(4-hydroxycumyl) benzenes, and alkyl substituted 1,3-bis(4-hydroxycumyl) benzenes; and (c) a diacid component which is comprised of from about 90 to 100 mole percent terephthalic acid and from 0 to about 10 mole percent isophthalic acid; wherein the mole ratio of aromatic hydroxy acid to diol is within the range of about 80:20 to about 99:1.

3. A copolyester as specified in claim 1 wherein at least one member selected from the group consisting of 1,4-bis(4-hydroxycumyl) benzene, 1,3-bis(4-hydroxycumyl) benzene, alkyl substituted 1,4-bis(4-hydroxycumyl) benzenes and alkyl substituted 1,3-bis(4-hydroxycumyl) benzenes is 1,4-bis(4-hydroxycumyl) benzene.

4. A copolyester as specified in claim 1 wherein the diol component is comprised of from about 90 to about 98 mole percent phenyl hydroquinone.

5. A copolyester as specified in claim 1 wherein the diol component is comprised of from about 93 to about 97 mole percent phenyl hydroquinone.

6. A copolyester as specified in claim 3 wherein the diol component is comprised of from about 93 to about 97 mole percent phenyl hydroquinone.

7. A copolyester as specified in claim 6 wherein the diacid component consists essentially of terephthalic acid.

8. A copolyester as specified in claim 1 wherein the copolyester has a number average molecular weight which is within the range of about 5,000 to about 100,000.

9. A copolyester as specified in claim 1 wherein said copolyester has a number average molecular weight which is within the range of about 10,000 to about 60,000.

10. A copolyester as specified in claim 2 wherein the aromatic hydroxy acid is hydroxy benzoic acid.

11. A copolyester as specified in claim 2 wherein the aromatic hydroxy acid is hydroxy naphthoic acid.

* * * * *